United States Patent [19]
Lennon

[11] Patent Number: 5,145,210
[45] Date of Patent: Sep. 8, 1992

[54] BICYCLE, HANDLEBAR AND ADAPTER SYSTEM

[76] Inventor: Dan C. Lennon, Box 1177, Hailey, Id. 83333

[21] Appl. No.: 787,698

[22] Filed: Nov. 1, 1991

Related U.S. Application Data

[63] Continuation of Ser. No. 428,373, Oct. 27, 1989, abandoned, which is a continuation-in-part of Ser. No. 173,765, Mar. 28, 1988, Pat. No. 4,878,397, which is a continuation-in-part of Ser. No. 1,616, Jan. 9, 1987, Pat. No. 4,750,754.

[51] Int. Cl.$^5$ .................. B62K 21/12; B62K 21/26
[52] U.S. Cl. ................ 280/281.1; 74/551.1; 74/551.8; 74/551.9; 280/261; 280/270; 280/288.4
[58] Field of Search ........... 280/261, 263, 270, 281.1, 280/288.4; 74/551.1, 551.2, 551.3, 551.4, 551.6, 551.8, 551.9

[56] References Cited

U.S. PATENT DOCUMENTS

| | | |
|---|---|---|
| 586,678 | 7/1897 | Walsh . |
| 1,445,995 | 2/1923 | Carlson . |
| 1,448,921 | 3/1923 | Ershkowitz . |
| 1,660,131 | 2/1928 | Lenfers . |
| 1,994,837 | 3/1935 | St. Onge . |
| 3,289,493 | 12/1966 | Church ................. 74/551.8 |
| 4,750,754 | 6/1988 | Lennon .............. 280/288.4 X |
| 4,930,798 | 6/1990 | Yamazaki et al. ............. 280/261 |

FOREIGN PATENT DOCUMENTS

| | | |
|---|---|---|
| 88154122 | 4/1989 | Fed. Rep. of Germany . |
| 961924 | 5/1950 | France . |
| 60-72389 | 5/1985 | Japan . |
| 60-72390 | 5/1985 | Japan . |
| 1041386 | 9/1983 | U.S.S.R. ................. 280/270 |

Primary Examiner—Mitchell J. Hill
Attorney, Agent, or Firm—Jenner & Block

[57] ABSTRACT

Handlebars for a bicycle include a central crosspiece connectable to a bicycle steering post and sidewardly extending portions which may include a pair of pads for supporting a rider's forearms. A generally vertical handgrip portion is located by an intermediate section to a forward central region to permit the rider's hands to overlap each other while grasping the vertical handgrip portion and define a rider position in which the rider's elbows are located near the central rear portion and the rider's arms extend forwardly when the rider's hands are grasping the vertical handgrip portion. In certain embodiments, the vertical handgrip may be T shaped with additional horizontal sections. In other embodiments, an adapter allows the generally vertical handgrip and intermediate section to be clamped to an original bicycle handlebar.

36 Claims, 6 Drawing Sheets

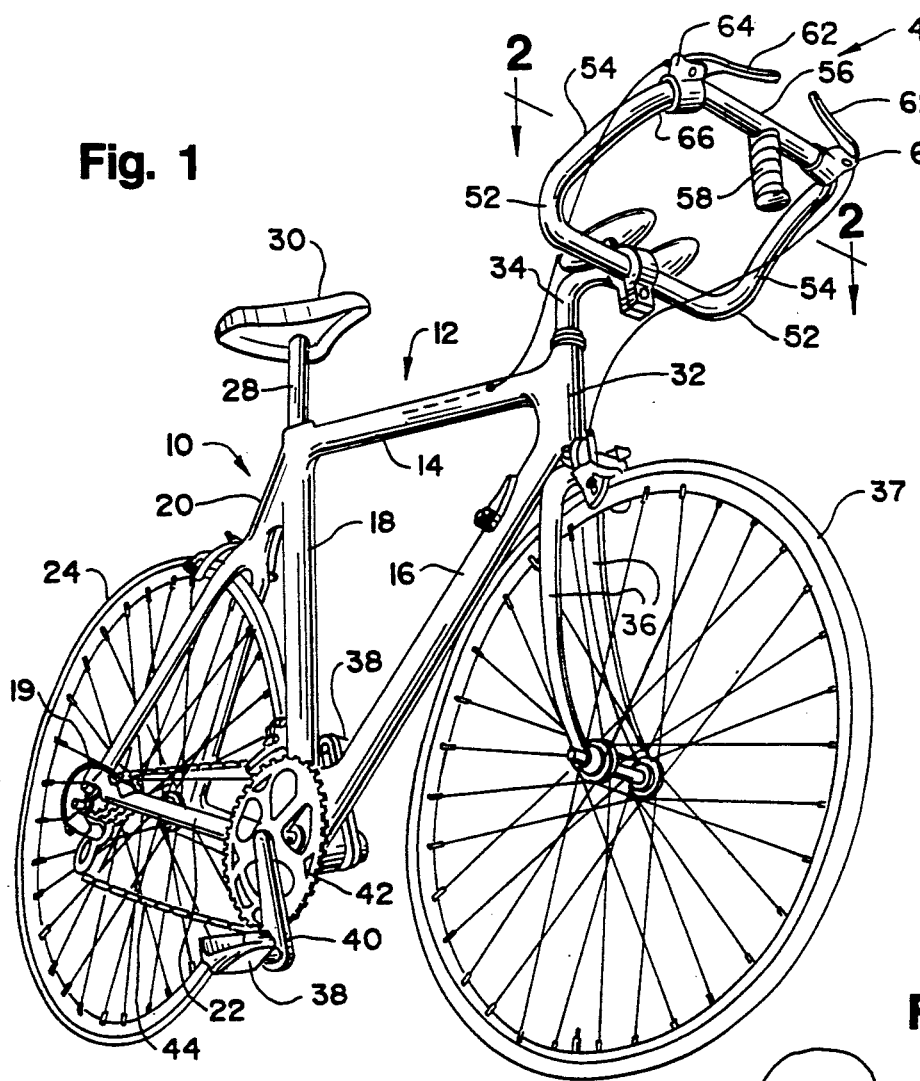
Fig. 1
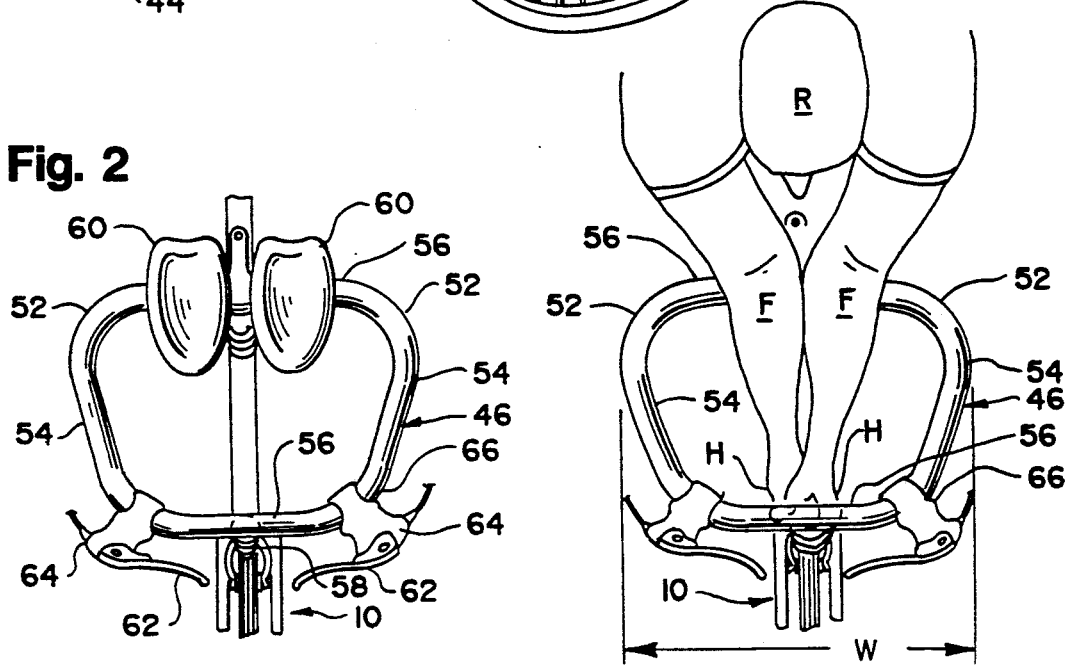
Fig. 2
Fig. 4

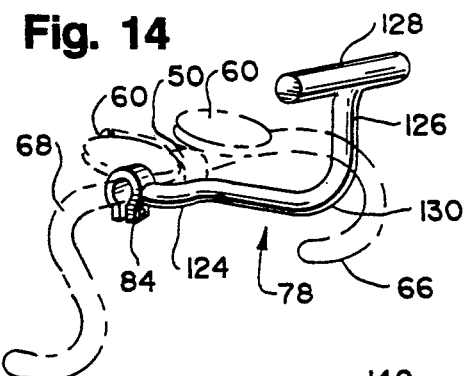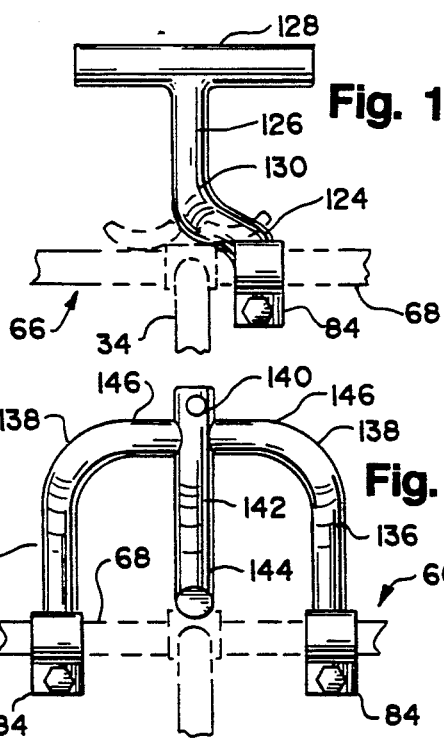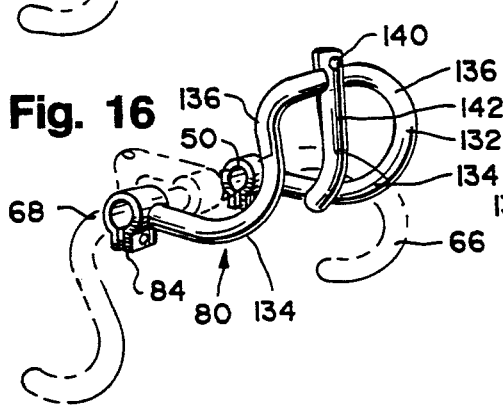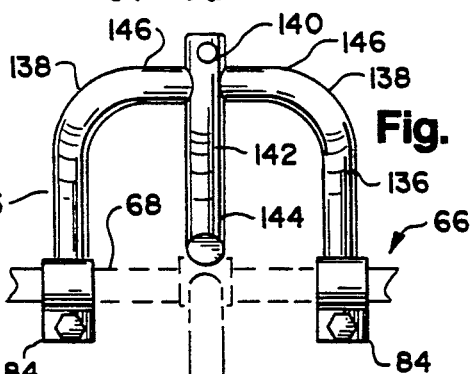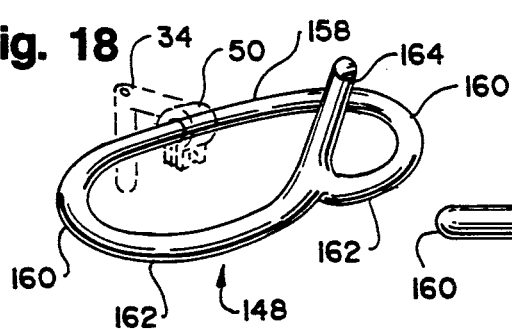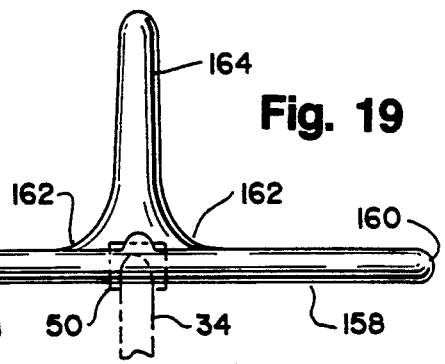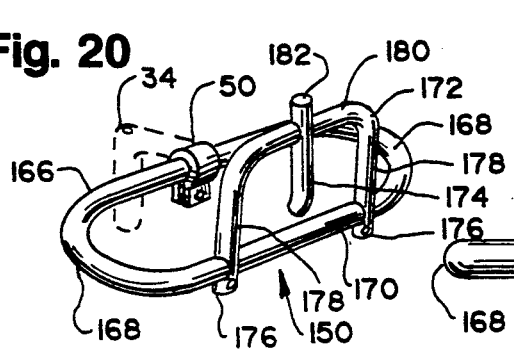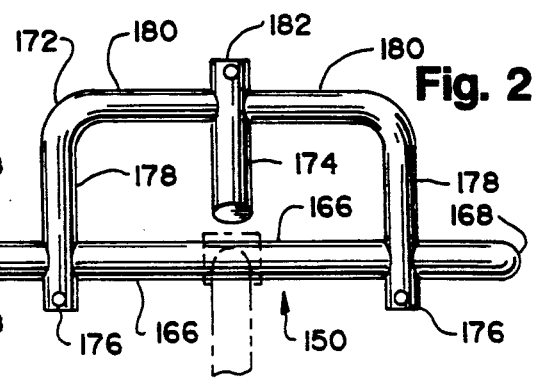

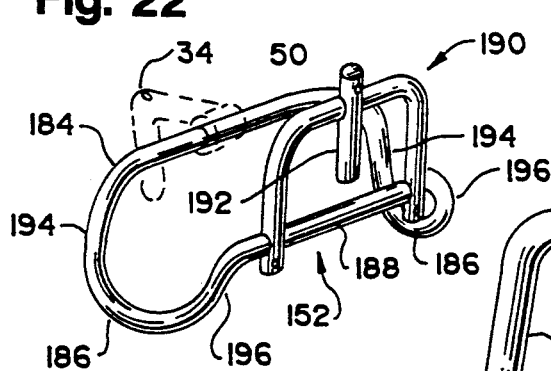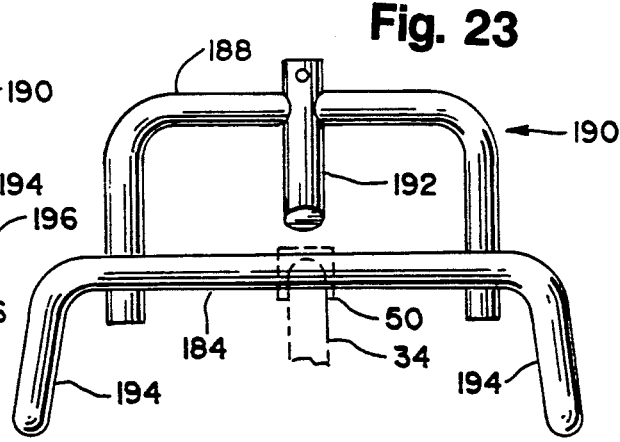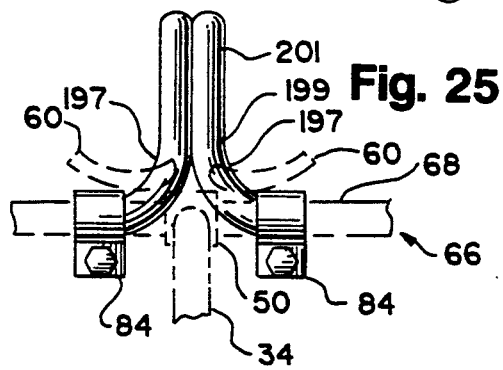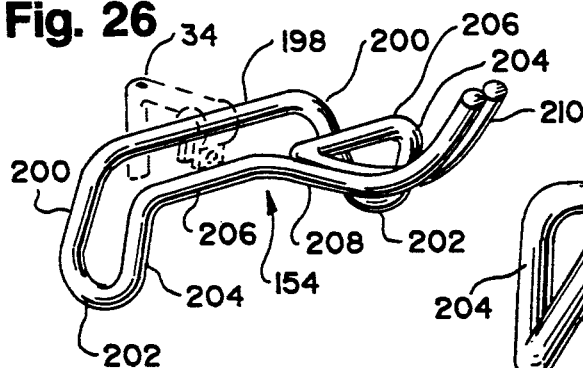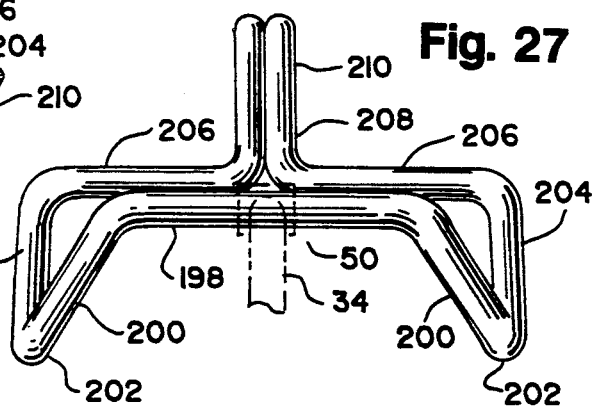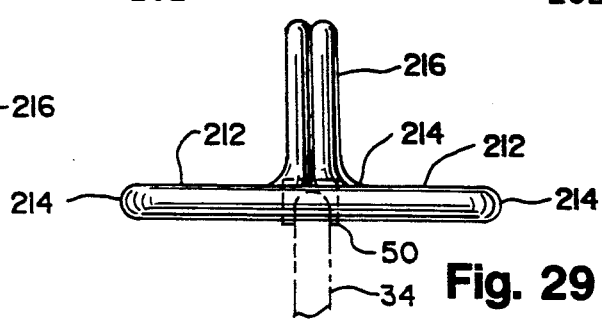

BICYCLE, HANDLEBAR AND ADAPTER SYSTEM

RELATED APPLICATION

This application is a continuation of application Ser. No. 07/428,373, filed Oct. 27, 1989, now abandoned, which is a continuation-in-part application of U.S. patent application Ser. No. 173,765, filed Mar. 28, 1988, now U.S. Pat. No. 4,078,397 which was a continuation-in-part application of U.S. patent application Ser. No. 001,616, filed Jan. 9, 1987, now U.S. Pat. No. 4,750,754, the disclosure of each application being hereby incorporated by reference.

BACKGROUND OF THE INVENTION

This invention relates to bicycles and handlebars therefor which are adapted to improve the performance and stamina of the rider.

The design of racing bicycles, or other special-purpose bicycles, is especially complex. Structural changes which may at first seem minor to the unskilled can provide significant improvement in bicycle performance. This improved performance can provide recognizable advantage to the bicycle rider.

To perform well in bicycle race competition (especially competition of extended duration or length) a minimized frontal area and shape should be presented by the combination of the bicycle and the bicycle rider. Frontal area minimization is not enough, however; the position of the bicycle rider must be comfortable so that the rider can produce requisite high levels of effort and performance for long periods of time.

Frontal areas and rider positions are greatly affected by the position, shape, and arrangement of the bicycle handlebars. Simply as an example, a bicycle having handlebar grips located in a relatively raised position will encourage a rider to assume a relatively upright riding position. While this position may be comfortable, a large frontal area is presented, and the relatively large ensuing wind resistance minimizes top speed even though the rider may be producing a large amount of pedaling effort. Conversely, a bicycle having relatively low-set handlebars encourages the rider to assume a position in which the frontal area is reduced. Small frontal area results in higher top speed with less rider effort. But in prior racing bicycles, the rider is fatigued over time due to the crouched position and is not able to sustain endurance through a long race.

It is an object of the present invention to provide a bicycle and handlebar system located and oriented so as to encourage the bicycle rider to assume an efficient, yet comfortable, riding position which can be sustained over long periods of time. It would also be desirable to provide such a handlebar that would not be objectionable for mass-start bicycle events as a result of the handlebar pointing forward and being open ended.

Another object is to provide handlebars for a bicycle which will encourage the cyclist to assume a comfortable and efficient position on the bicycle when the handlebars are properly mounted on the bicycle.

SUMMARY OF THE INVENTION

In accordance with the present invention, novel bicycle and handlebar systems improve the aerodynamic silhouette and the endurance of the rider by providing a low and narrow silhouette. The most desirable modes involve entirely new designs for the handlebars. However, many of the advantages can be obtained by an adapter kit by which a new handlebar system can be attached to an existing bicycle having either conventional handlebars or handlebars of the type disclosed in U.S. Pat. No. 4,750,754 and U.S. patent application Ser. No. 173,765, filed Mar. 28, 1988.

The handlebars in accordance with one embodiment of the invention are connectable to a bicycle steering post located forwardly of a bicycle seat and include a central rear portion connectable to the steering post and structure for supporting a rider's forearms which may be connected to the central rear portion and can include sidewardly extending portions, which may extend from either side of the central rear portion. A substantially vertical handgrip portion is provided that is connected to the central rear portion by a forwardly extending intermediate portion. The substantially vertical handgrip portion is located substantially along the longitudinal centerline of the bicycle and forward of the steering post when the handlebar is mounted on the bicycle. The handgrip portion is located forwardly of the steering post to define a rider position in which the rider's elbows are located near the central rear portion of the handlebar and the rider's arms extend forwardly when the rider is mounted on the bicycle and the rider's hands are grasping the handgrip portion.

The handlebar may further include a horizontal portion that extends laterally from the substantially vertical handgrip portion to provide additional handgrip positions. The horizontal portion may extend from both sides of the substantially vertical handgrip portion and may form a T-shape. Such horizontal portion may extend from the top, bottom or other portion of said vertical handgrip portion.

The bicycle handlebar in accordance with the invention may further include turned portions that extend from the horizontal portion and include rearwardly turned bends that extend rearwardly to provide the intermediate portion followed by inwardly turned bends that extends towards the steering post for supporting the rider's forearms.

The top of the horizontal portion adjacent the vertical handgrip portion may provide a resting area for a rider's thumbs when the rider's hands are gripping the substantially vertical handgrip. The horizontal portion may extend sufficiently from the sides of the substantially vertical handgrip to form additional hand positions for the rider.

In accordance with another embodiment of the invention, a bicycle handlebar that is mountable to a bicycle steering post located forwardly of a bicycle seat is provided. The bicycle handlebar includes a central rear portion connectable to a steering post and sidewardly extending portions for supporting a rider's forearms. A handgrip portion permits the rider's hands to overlap each other while grasping the handgrip portion. An intermediate portion extends forwardly and connects the central rear portion to the handgrip portion. The handgrip portion is positionable in a fixed position with respect to the steering post substantially along the longitudinal centerline of the bicycle and forward of the steering post when the handlebar is mounted to the bicycle.

In accordance with another aspect of the present invention, a bicycle is provided that includes a frame, a rear wheel journaled to the frame, a steering post journaled to the frame, a front fork attached to the steering post, a front wheel journaled to the fork, a saddle affixed to the frame at a predetermined position above the frame and a handlebar as previously described connected to the steering post. The handlebar includes a rear portion connected to the steering post, a central forward portion providing a handgrip permitting the rider's hands to overlap each other while grasping the handgrip and an intermediate portion that extends forwardly from the rear portion and connects the rear portion with the forward portion. The handgrip may be a substantially vertical handgrip portion. In addition, the handlebar may also include other structure or configurations as described herein.

In accordance with still another aspect of the present invention, an adapter kit for a bicycle having an original handlebar connected to a steering post is provided. The adapter kit includes a handlebar extension member having at least one clamp at an end thereof for engaging the original handlebars, the handlebar extension member having a forwardly extending intermediate portion and a substantially vertical handgrip portion connected to the intermediate portion located to define a rider position in which the rider's hands can be in contact with each other when grasping the handgrip portion and the rider's elbows are located near the steering post and the central rear portion with the rider's arms extending forwardly toward the handgrip portion. The intermediate portion may be elongated and the length from the substantially vertical handgrip portion to the central rear portion where the handlebar connects to the bicycle stem clamp typically will be in the range of from about 9 to about 14 inches and preferably about 12 inches.

The adapter kit may further include a horizontal portion extending laterally from the substantially vertical handgrip portion and the horizontal portion can extend from both sides of the handgrip portion. For example, the handgrip portion and the horizontal portion may form a T-shape.

In accordance with one embodiment of the adapter kit, the clamp can be rotated with respect to the original handlebar to selectively raise or lower the intermediate portion and the handgrip portion.

In accordance with one aspect of the adapter kit, the handlebar extension member is U-shaped and has a clamp at each end for attachment to the original bar with the handgrip portion extending from the apex of the U-shaped extension member and the U-shaped extension member provides additional hand positions for the rider. The handgrip portion may be adjustably rotatable about the U-shaped extension portion to change the inclination of the handgrip portion. The handgrip portion may be oriented such that it extends upwardly when the extension member is mounted in a forwardly extending position on the original handlebar. Alternatively, the handgrip portion may extend downwardly.

In accordance with still another aspect of the present invention, a bicycle handlebar is provided that is connectable to a bicycle steering post located forwardly of a bicycle seat. The handlebar includes a central rear portion connectable to the steering post and support structure associated with the rear portion for supporting a rider's forearms. An intermediate member is provided that extends forwardly from the rear portion and at least one handgrip portion is connected to the intermediate member and is located forwardly of the steering post to define a rider position in which the rider's elbows are located near the central rear portion and the rider's arms extend forwardly when the rider's hands are grasping the handgrip portion. In accordance with one embodiment of this aspect of the invention, the bicycle handlebar has at least two spaced apart handgrip portions connected to the intermediate portion. In accordance with another embodiment of this aspect of the invention, the handlebar has a single handgrip portion, that can be substantially vertical, that permits the rider's hands to overlap each other while grasping the handgrip. The support structure for supporting the rider's forearms can be sidewardly extending portions that extend from the central rear portion.

In accordance with still another aspect of the present invention, a bicycle handlebar mountable to a bicycle steering post located forwardly of a bicycle seat is provided that includes a central rear portion connectable to the steering post, a handgrip portion that permits the rider's hands to overlap each other while grasping the handgrip portion. The handgrip portion is located forwardly of the steering post to define a rider position in which the rider's elbows are located near the central rear portion and the rider's arms extend forwardly when the rider's hands are grasping the handgrip portion. An intermediate portion extends forwardly and connects the rear portion to the handgrip portion.

BRIEF DESCRIPTION OF THE DRAWINGS

FIG. 1 is a perspective view of a bicycle in accordance with the invention and including an embodiment of the novel handlebar system;

FIG. 2 is a plan fragmentary view taken from a position above and forward of the bicycle shown in FIG. 1;

FIG. 4 is a developed fragmentary view taken from a position above and forward of the bicycle shown in FIG. 3 with the rider aboard in riding position;

FIG. 14 is a perspective view of another handlebar embodiment of the present invention;

FIG. 15 is a rear elevation view of the handlebar of FIG. 14;

FIG. 16 is a perspective view of another handlebar embodiment of the present invention;

FIG. 17 is a rear elevation view of the handlebar of FIG. 12;

FIG. 18 is a perspective view of another handlebar embodiment of the present invention;

FIG. 19 is a rear elevation view of the handlebar of FIG. 12;

FIG. 20 is a perspective view of another handlebar embodiment of the present invention;

FIG. 21 is a rear elevation view of the handlebar of FIG. 12;

FIG. 22 is a perspective view of another handlebar embodiment of the present invention;

FIG. 23 is a rear elevation view of the handlebar of FIG. 12;

FIG. 24 is a perspective view of another handlebar embodiment of the present invention;

FIG. 25 is a rear elevation view of the handlebar of FIG. 12;

FIG. 26 is a perspective view of another handlebar embodiment of the present invention;

FIG. 27 is a rear elevation view of the handlebar of FIG. 12;

FIG. 28 is a perspective view of another handlebar embodiment of the present invention;

FIG. 29 is a rear elevation view of the handlebar of FIG. 12;

DETAILED DESCRIPTION

While the invention will be described in connection with preferred embodiments, it will be understood that it is not intended to limit the invention to these embodiments. On the contrary, it is intended to cover all alternatives, modifications or equivalents as may be included within the spirit and scope of the invention as defined by the appended claims.

Figure 3:
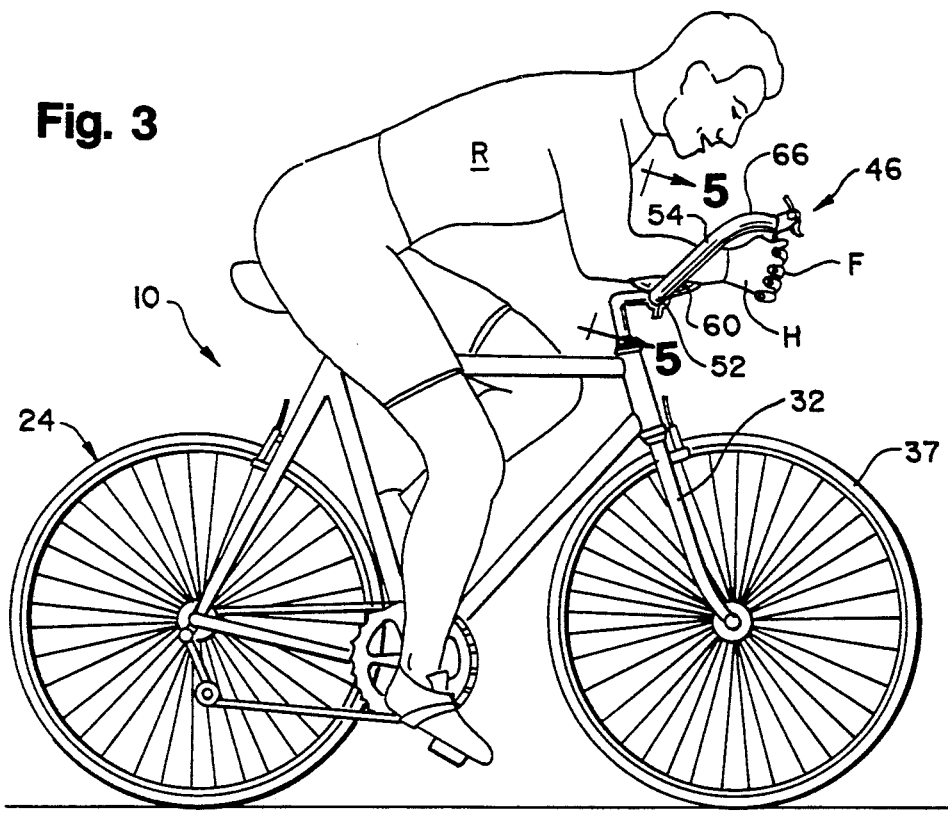
FIG. 3 is a side elevation view of the bicycle of FIG. 1 with a bicycle rider aboard in riding position.

Referring to the FIGURES generally, and in particular to FIGS. 1 and 3, there is shown a bicycle 10 which includes a triangular-shaped frame 12 comprised of a top tube 14, a down tube 16 and a seat tube 18. Seatstays 20 and chainstays 22 join to rigidly secure a rear wheel 24 and its axle 19. Extending from seat tube 18 is seat post 28. Mounted atop seat post 28 is a saddle 30. Seat post 28 may be raised or lowered into the seat tube to accommodate riders of differing heights. Top tube 14 and down tube 16 extend forwardly to a fork or head tube 32. Journaled within fork tube 32 is a stem 34 leading to front forks 36. A front wheel 37 is mounted to the end of front forks 36. Pedals 38 mounted to cranks 40 operate a drive sprocket 42 and a chain drive 44 in a known manner to propel the bicycle. A handlebar 46 in accordance with the invention is attached to stem 34.

Figure 5:
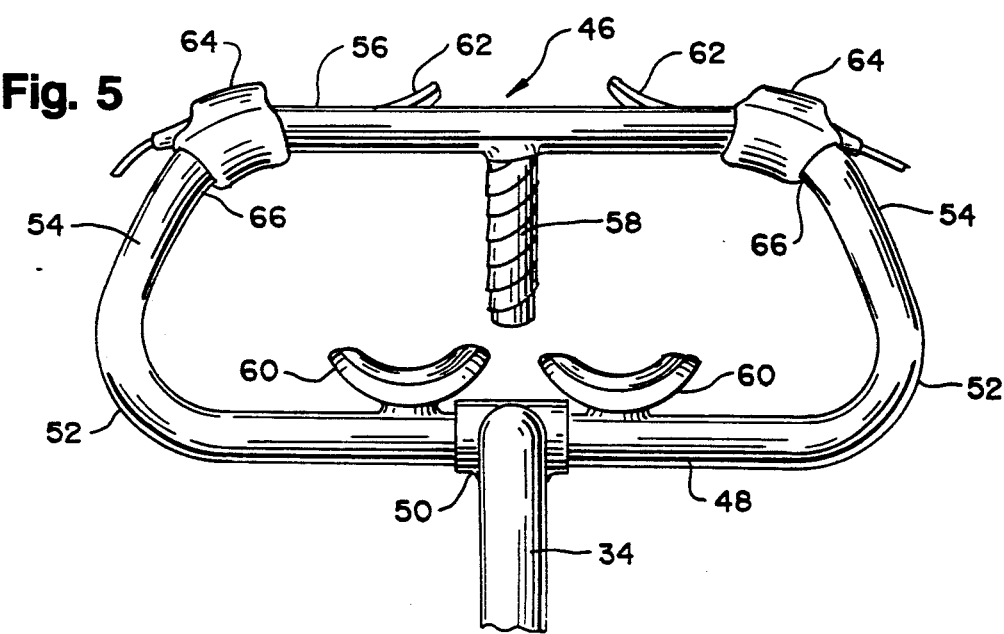
FIG. 5 is a developed fragmentary view of the bicycle handlebars as they appear from a position above and forward of the bicycle along lines 5—5 of FIG. 3 with the rider being omitted for clarity.

Handlebar 46 is shown in more detail in FIGS. 2, 4 and 5. FIG. 2 shows handlebar 46 and bicycle 10 in a plan fragmentary view taken from a position above and forward of bicycle 10. FIG. 4 shows a rider R in riding position on bicycle 10, shown in fragmentary view and illustrating handlebar 46. FIG. 5 illustrates handlebar 46 from a position above and forward of saddle 30 with only stem 34 of bicycle 10 being illustrated.

Handlebar 46 includes a central rear portion 48 which may be a crosspiece section to which stem 34 is connected to the midpoint of central rear portion 48 by a stem clamp 50. Stem 34 may be raised or lowered relative to the head tube 32 by adjusting a stem bolt (not shown). Extending from opposite ends of central rear portion 48 are turned portions 52 that extend generally forwardly and inwardly to define a pair of forwardly extending handle portions 54 located and adapted to be grasped in a known manner by a rider. A front loop portion 56 interconnects forward handle portions 54 so that handlebar 46 defines a continuous loop forward of the steering post. Front loop portion 56 may be a continuous section as illustrated in FIGS. 1-4 and in detail in FIG. 5 or front loop portion 56 may form a separate section of handlebar 46 (not shown).

The most aerodynamic grip position of handlebars 46 for rider R is provided by handgrip 58 which extends downwardly from front loop portion 56. Handgrip 58 is a section of tubing that is oriented so that it is substantially vertical and at least substantially along the centerline of bicycle 10 when front wheel 37 is aligned with rear wheel 24 for bicycle 10 to travel in a straight line. As illustrated in FIGS. 3 and 4, handgrip 58 is grasped by rider R in a manner such that hands H of rider R overlap. The fingers F of rider R may also interlock and/or overlap with the fingers of rider R's other hand, as shown in FIGS. 3 and 4. The thumbs T of rider R may be placed over front loop portion 56 adjacent handgrip 58.

As an alternate embodiment, handgrip 58 could extend upwardly from front loop portion 56.

Rider R's forearms rest on forearm rests 60 secured to central rear portion 48 that are relatively closely spaced to each other to help define an optimum aerodynamic riding position as shown in FIGS. 3 and 4. Rider R's forearms F are preferably touching as illustrated in FIG. 4 or as close together as possible. The resulting frontal profile that rider R presents is minimized, thereby reducing drag. Rider R's relatively low head position, together with the hand and forearm position, minimizes the amount of air that strikes the chest cavity of rider R, thereby reducing drag.

Front loop portion 56 also provides a location where rider R can grip with the rider's hands separated, such as on or adjacent brake levers 62 extending from brake hoods 64. Padding or other material, such as plastic, rubber or tape, for example, can be attached over front loop portion 56 and even over forwardly extending handle portions 54, if desired, to provide a desired shape to facilitate gripping by a rider.

As illustrated in FIGS. 1, 3 and 5, each of turned portions 52 include an upwardly extending bend that extends above central rear portion 48 followed by forwardly extending handle portions 54 which extend into downwardly and inwardly curving bends 66 that extend into front loop portion 56.

Forwardly extending handle portions 54 of handlebar 46, as illustrated in FIGS. 1-5 are spaced apart slightly less than the width of central rear portion 48 and preferably extend upwardly to facilitate grasping by the rider. If desired, other portions of handlebar 46 can be grasped by the rider, such as central rear portion 48, turned portions 52, bends 66 or front loop portion 56.

In accordance with the invention, a small-frontal-area yet comfortable riding position is encouraged by providing novel front loop portion 56 and handgrip 58, which can be forward of the other portions of handlebar 46 as illustrated particularly in FIGS. 1-4. Handgrip 58 is located so that, as illustrated in FIGS. 2 and 4, when it is grasped by a bicycle rider R, the rider's forearms F are located and supported by handlebar 46 at positions over central rear portion 48 and adjacent stem clamp 50. Together, then, handlebar 46, the position of saddle 30 and distance from handlebar 46 define a riding position in which the frontal area of the rider's silhouette is minimized, as especially suggested in FIG. 4. Furthermore, when the saddle and stem positions are properly adjusted so that the rider's back will be substantially straight and horizontal when grasping handgrip 58, wind resistance is further reduced and rider comfort is enhanced. In addition, in this position, it is believed that the weight distribution on the bicycle changes from rear bias to an approximately even weight distribution on the front and back tires. It is believed that such weight distribution provides decreased rolling resistance.

Moreover, the width W of the rider's silhouette is minimized by positioning the rider's forearms or elbows so as to be touching or almost touching, as shown in FIG. 2. To this end, forearm rests 60 are each located rather closely adjacent stem clamp 50. In this way, the maximum width W of the silhouette is extended position. The rider's arms and elbows do not extend outside this profile and the width of rider R gets progressively narrower going from the shoulders of rider R to the hands of rider R on handgrip 58, which approximates the leading edge of the rider being a single point. In this position, the rider provides an improved aerodynamic shape and the rider's arms and elbows do not contribute to increased frontal area and consequently wind drag is reduced. To further reduce wind resistance, the head of rider R should be relatively low, just above and behind handgrip 58.

The chord length or straight line distance from central rear portion 48 to grip 58 of handlebar 46 is preferably on the order of about 12 inches. Under these circumstances, as particularly illustrated in FIG. 2, the rider naturally assumes the position in which his forearms and upper arms are located directly ahead of his torso. Because the rider's arms are located ahead of his lungs, breathing constrictions are minimized or eliminated. There is no pinching of the chest, breathing is unobstructed because the rider's weight can be on the handlebars transferred through the forearms, allowing the upper body to relax. If desired, brake levers 62 could be located on forward handle portions 54. Of course, additional brake handle or actuating mechanisms could also be installed on forward handle portions 54 or in other locations. The rider may also wish to position his hands along other portions of handlebars 46. For example, the rider may position his hands: (1) at turned portions 52; (2) at bends 66; (3) in position to grasp brake operating levers 62; (4) on front loop portion 56 (forearms on or off forearm rests 60); and (5) on central rear portion 48.

Handlebars in accordance with the invention, such as handlebars 46 can be constructed of aluminum tubing or other suitable material. The ends of the tubing can terminate at stem clamp 50 or above handgrip 58. The preferred tubing is 6061-T6 aluminum tubing having an outside diameter of 24.0 millimeters and an inside diameter of 20.5 millimeters. The handlebars of the present invention can be readily constructed by bending the tubing into the desired shape. Handgrip 58 can be added to front loop portion 56 by a clamp or by any other suitable structure or attachment method. Suitable methods and techniques of bending tubing into a desired shape are well known to those skilled in the art and therefore a description of how to bend tubing to form the various desired handlebar shapes is not provided herein.

Referring to FIGS. 6-17 and 24-25 there is illustrated various handlebar embodiments in accordance with the invention that are suitable for attachment to original handlebars. As shown in FIGS. 6-17 and 24-25, stem 34 is connected to original racing handlebars 66 at their crosspiece 68 by stem clamp 50. Also connected to crosspiece 68 are add-on handlebars 70, 72, 74, 76, 78, 80 and 82 in FIGS. 6-7, 8-9, 10-11, 12-13, 14-15, 16-17 and 24-25, respectively. Each of handlebars 70-82 are attachable to original handlebars 66 by means of one or more clamps 84 that can be secured to crosspiece 68 of original handlebars 66 by tightening clamp bolt 85 of clamp 84. Each of handlebars 70-82 permits the bicycle rider to assume the same position as illustrated in FIGS. 3 and 4 as previously described. The height of handlebars 70-82 can be adjusted by loosening clamp(s) 84 and then rotating the handlebar to a desired position about crosspiece 68 and tightening clamp(s) 84 while the handlebar is in the desired position. The handlebars can be used with or without forearm rests on crosspiece 68, as desired. For example, suitable forearm rests 60 as previously described may also be provided with any of handlebars 70-82. Tape 92 may also be applied over the handgrip or other portion of the handlebars, as shown in FIGS. 6-7.

Figure 6:
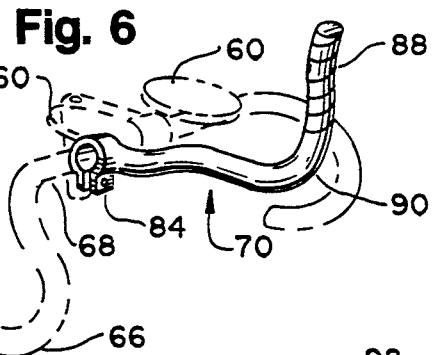
FIG. 6 is a perspective view of another embodiment of the handlebars in accordance with the invention.
Figure 7:
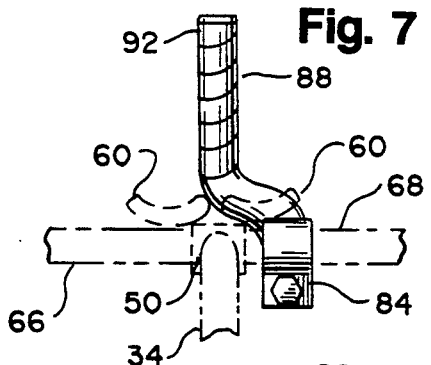
FIG. 7 is a rear elevation view of the handlebar of FIG. 6.

Handlebar 70, illustrated in FIGS. 6 and 7 includes clamp 84, a forwardly extending intermediate portion 86 and a handgrip 88. Forwardly extending portion 86 is a section of tubing attached to clamp 84 that extends forward substantially horizontally and laterally so that handgrip 88 at the end of forwardly extending portion 86 is aligned with stem 34 so that handgrip 88 is located substantially along the centerline of the bicycle as previously described with respect to FIGS. 1-5. The forward end of forwardly extending portion 86 terminates in an upwardly extending bend 90 and handgrip 88 extends at least substantially vertically upwardly. Handgrip 88 can be grasped by a bicycle rider with both hands overlapping as described with respect to handlebar 46 of FIGS. 1-5. The rider's thumbs can overlap across the top or behind handgrip 88.

Figure 8:
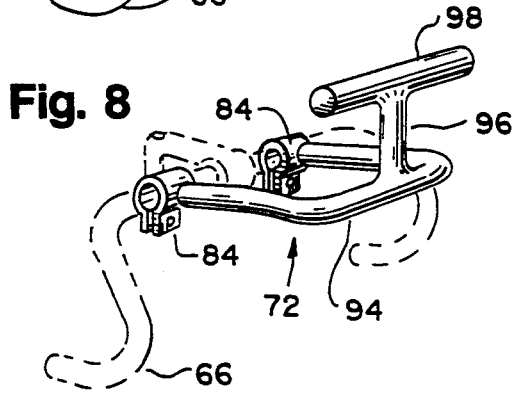
FIG. 8 is a perspective view of another handlebar embodiment of the present invention.
Figure 9:
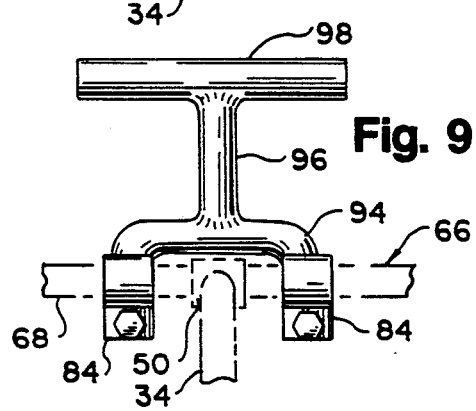
FIG. 9 is a rear elevational view of the handlebar of FIG. 8.

Referring to FIGS. 8 and 9, add-on handlebar 72 is illustrated attached to original handlebars 66. Handlebar 72 includes a pair of clamps 84 for securing handlebar 72 to crosspiece 68 as previously described. Handlebar 72 further includes a forwardly extending intermediate portion which in this embodiment is a U-shaped extension member 94. The two ends of member 94 are secured to handlebar 66 by clamps 84. At the apex of member 94 is attached vertical handgrip 96 that extends upwardly from member 94. Handlebar 72 further includes a horizontal member 98 that extends from either side of the top of handgrip 96 for providing additional handgrip positions.

Figure 10:
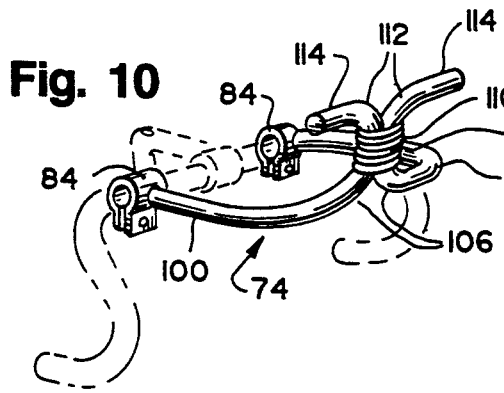
FIG. 10 is a perspective view of another handlebar embodiment of the present invention.
Figure 11:
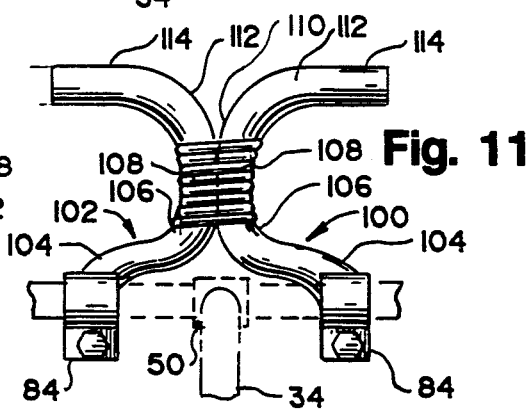
FIG. 11 is a rear elevation view of the handlebar of FIG. 10.

Referring to FIGS. 10 and 11, add-on handlebar 74 is illustrated attached to original handlebar 66. Handlebar 74 includes a pair of clamps 84 for securing handlebar 74 to crosspiece 68 as previously described. Handlebar 74 further includes a first forwardly extending intermediate portion 100 and a second forwardly extending intermediate portion 102 that complements first forwardly extending intermediate portion 100. Each intermediate portion 100, 102 includes an inwardly extending bend 104 adjacent clamp 84. Inwardly extending bend 104 is followed by an upwardly extending bend 106 that brings tubular members 100 and 102 in contact with each other followed by relatively vertical portions 108 that together define a substantially vertical handgrip portion located along the centerline of the bicycle when mounted as illustrated in FIGS. 10 and 11. Tubular members 100 and 102 may be taped together with tape 110 as illustrated in FIGS. 10 and 11 in the area of relatively vertical handgrip portion 108 and other portions of handlebar 74, if desired (not shown). Outwardly extending bends 112 extend from the upper portions of handgrip portion 108 and terminate at relatively horizontal portions 114 to provide additional handgrip positions in which the rider's hands can be spaced apart while gripping horizontal portions 114.

Figure 12:
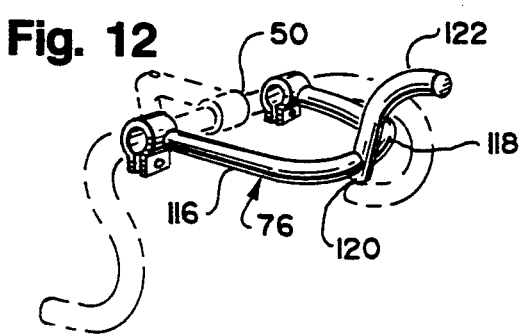
FIG. 12 is a perspective view of another handlebar embodiment of the present invention.
Figure 13:
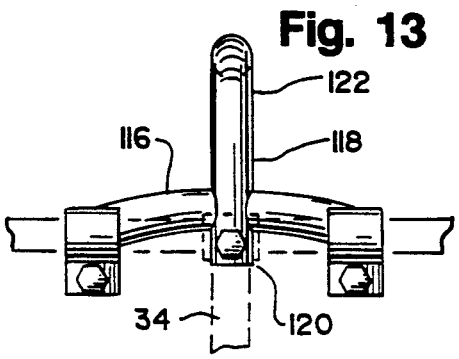
FIG. 13 is a rear elevation view of the handlebar of FIG. 12.

Referring to FIGS. 12 and 13, add-on handlebar 76 is illustrated attached to original handlebar 66. Handlebar 76 includes a pair of clamps 84 for securing handlebar 76 to crosspiece 68 as previously described. Handlebar 76 further includes a forwardly extending intermediate portion which in this embodiment is a U-shaped extension member 116. The two ends of member 116 are secured to handlebar 66 by clamps 84. At the apex of member 116 is attached a substantially vertical handgrip 118 by means of a clamp 120 located at the lower end of vertical handgrip 118. The upper end of vertical handgrip 118 includes a forwardly extending bend 122. Forwardly extending bend 122 provides a location for a rider's thumbs to rest when the rider's hands grip substantially vertical handgrip 118. U-shaped extension member 116 also provides additional handgrip positions for the bicycle rider.

Referring to FIGS. 14 and 15, add-on handlebar 78 is illustrated attached to original handlebars 66. Handlebar 78 includes a clamp 84 for securing handlebar 78 to crosspiece 68 as previously described. Handlebar 78 further includes a forwardly extending intermediate portion 124, a substantially vertical handgrip 126 and a horizontal portion 128 that extends from either side of the top of vertical handgrip 126 for providing additional handgrip positions. Forwardly extending portion 124 is a section of tubing attached to clamp 84 that extends forward substantially horizontally and laterally sufficiently so that handgrip 126 at the end of forwardly extending portion 124 is aligned with stem 34 so that handgrip 126 is located substantially along the centerline of the bicycle as previously described with respect to FIGS. 1-5. The forward end of forwardly extending portion 124 terminates in an upwardly extending bend 130 and handgrip 126 extends at least substantially vertically upwardly therefrom. Handgrip 126 can be grasped by a bicycle rider with both hands overlapping as described with respect to handlebar 46 of FIGS. 1-5. The rider's thumbs can overlap across the top or behind handgrip 126.

Referring to FIGS. 16 and 17, add-on handlebar 80 is illustrated attached to original handlebar 66. Handlebar 80 includes a pair of clamps 84 for securing handlebar 80 to crosspiece 68 as previously described. Handlebar 80 further includes a forwardly extending intermediate portion which in this embodiment is an upturned U-shaped extension member 132. The ends of U-shaped extension member 132 are secured to handlebar 66 by clamps 84. Approximately midway between the ends of U-shaped extension member 132 and its apex, member 132 is upturned by means of upturned bends 134 as illustrated in FIG. 16. Upturned bends 134 are followed by relatively vertical portions 136 that provide spaced apart handgrips for a bicycle rider. Relatively vertical portions 136 are followed by inwardly extending bends 138 that converge at the apex of U-shaped extension member 132. At this point is attached by a clamp 140 a downwardly extending substantially vertical handgrip 142. Vertical handgrip 142 includes at its lower end a rearwardly extending bend 144 allowing the bicycle rider to vary his grip position on vertical handgrip 142.

Handlebar 80 thus provides a number of different handgrip positions, including at relatively vertical portions 136, on vertical handgrip 142, at the ends of U-shaped extension member 132 adjacent clamps 84 and on relatively horizontal portions 146 on either side of vertical handgrip 142.

Referring to FIGS. 18-23 and 26-30 there is illustrated various handlebar embodiments in accordance with the invention that are attachable directly to bicycle stem clamp 50. Handlebars 148, 150, 152, 154 and 156 are secured directly to stem clamp 50 as shown in FIGS. 18-19, 20-21, 22-23, 26-27 and 28-29, respectively. Each of handlebars 148-156 permits the bicycle rider to assume the same position as illustrated in FIGS. 3 and 4 as previously described.

Typically, the distance from the vertical portion of bicycle stem clamp 50 to the vertical handgrip for handlebars in accordance with the invention is in the range of from about 9 to about 14 inches and most preferably about 12 inches. Usually, the vertical height or length of the vertical handgrip for handlebars in accordance with the invention will be in the range of from about 4 to about 6 inches and preferably about 5 inches. It is to be understood that variations may be made in these distances, such as to take into account for the physical dimension of the bicycle rider, for example.

Referring to FIGS. 18 and 19, handlebar 148 is illustrated attached to stem 34 by stem clamp 50. Handlebar 148 includes a central rear portion 158, forwardly extending portions 160, forward converging portions 162 and substantially vertical handgrip 164. Central rear portion 158 is a crosspiece and extends laterally from either side of stem clamp 50 and then handlebar 148 extends forwardly providing forwardly extending portions 160, which a bicycle rider may grip during riding. Handlebar 148 then bends inwardly providing converging portions 162, which are substantially parallel to central rear portion 158. At the location where portions 162 converge to form a loop at least substantially in line with stem 34 and stem clamp 50, handlebar 148 extends upwardly to provide substantially vertical handgrip 164. Handgrip 164 can be grasped by a bicycle rider with both hands overlapping as described with respect to handlebar 46 of FIGS. 1-5. Other gripping positions are also provided by handlebar 148. For example, gripping positions are provided by central rear portion 158, forwardly extending portions 160 and converging portions 162.

Referring to FIGS. 20 and 21, handlebar 150 is illustrated attached to stem 34 by stem clamp 50. Handlebar 150 includes a central rear portion or crosspiece 166, forwardly extending portions 168, forward crosspiece 170, inverted U-shaped forward portion 172 and a substantially vertical handgrip 174. Central rear portion 166 is a crosspiece and extends laterally from either side of stem clamp 50. Handlebar 150 extends forwardly from central rear portion 166 providing forwardly extending portions 168 which a bicycle rider may grip during riding. Handlebar 150 then bends inwardly providing a forward crosspiece 170 that forms a loop with central rear portion 166 and forwardly extending portions 168. Inverted U-shaped forward portion 172 is attached to forward crosspiece 170 by clamps 176 which can be similar to clamps 84 and stem clamp 50. Inverted U-shaped forward portion 172 includes substantially vertically spaced apart handgrip portions 178 and horizontal handgrip portion 180 at the top of inverted U-shaped forward portion 172. Substantially vertical handgrip 174 depends downwardly from inverted U-shaped forward portion 172 in line with stem 34 and stem clamp 50. Handgrip 174 is secured to U-shaped forward portion 172 by a clamp 182. The relative position of handgrip 174 with respect to U-shaped forward portion 172 can be adjusted by rotating handgrip 174 to a desired position about U-shaped forward portion 172 and then tightening clamp 182 of handgrip 174 to secure handgrip 174 in a fixed position. Similarly, U-shaped forward portion 172 can be adjusted with respect to forward crosspiece 170 in a similar manner by loosening clamps 176, adjusting U-shaped forward portion 172 to a desired position and tightening clamps 176 to secure U-shaped forward portion 172 in a desired position. Handgrip 174 can be grasped by a bicycle rider with both hands overlapping as described with respect to handlebar 46 of FIGS. 1-5. Handlebar 150 provides many other gripping positions including, for example, at central rear portion 166, forwardly extending portions 168, forward crosspiece 170, and at various positions on inverted U-shaped forward portion 172.

Referring to FIGS. 22 and 23, handlebar 152 is illustrated attached to stem 34 by stem clamp 50. Handlebar 152 is similar in design to handlebar 150 as previously described with several differences as hereinafter discussed. Handlebar 152 includes a central rear portion or crosspiece 184, forwardly extending portions 186, forward crosspiece 188, inverted U-shaped forward portion 190 and a substantially vertical handgrip 192. The foregoing elements of handlebar 152 are similar to the elements of handlebar 150 previously described with the exception of forwardly extending portions 186. Between central rear portion 184 and forwardly extending portion 186 and forwardly extending portions 186 and forward crosspiece 188 are downwardly curved portions 194 and 196, respectively. Downwardly curved portions 194 and 196 allow forwardly extending portion 186 to be located lower than central rear portion 184 and forward crosspiece 188 to provide a handgrip position on forwardly extending portions 186 that is lower than central rear portion 184 and forward crosspiece 188.

Referring to FIGS. 24 and 25 there is illustrated add-on handlebar 82 which is composed of clamps 84, a pair of complementary forwardly and inwardly extending and converging handlebar portions 197, upwardly extending bends 199 and vertically upwardly extending handgrip 201. Handgrip 201 is formed by the convergence and vertical extension of complementary forwardly and inwardly extending portions 197 upon convergence. Handgrip 201 can be grasped by a bicycle rider with both hands overlapping as described with respect to handlebar 46 of FIGS. 1-5.

Referring to FIGS. 26 and 27, handlebar 154 is illustrated attached to stem 34 by stem clamp 50. Handlebar 154 includes a central rear portion 198, a downwardly extending portion 200 adjacent each end of central rear portion 198, followed by first forwardly extending portions 202, upwardly extending portions 204, followed by lateral converging portions 206 and second forwardly extending portions 208 that terminate in a forwardly and vertically extending handgrip portion 210. Second forwardly extending portions 208 and handgrip portion 210 are composed of parallel sections of tubing that are preferably in contact with each other and may be wrapped with tape (not shown) as desired. Handgrip portion 210 although substantially vertical, has a horizontal component so that the position of the rider's hands grasping handgrip portion 210 is slightly different than as previously described with respect to FIGS. 1-5 in that the rider's hands may be slightly downwardly inclined. Handlebar 154 provides many other gripping positions including, for example, at central rear portion 198, downwardly extending rear portions 200, first forwardly extending portions 202, upwardly extending portions 204, lateral converging portions 206 and second forwardly extending portions 208.

Referring to FIGS. 28 and 29, handlebar 156 is illustrated attached to stem 34 by stem clamp 50. Handlebar 156 includes a central rear portion 212, followed by forwardly and inwardly extending portions 214 that extend from each end of central rear portion 212. Forwardly and inwardly extending portions 214 converge and then extend upwardly to provide a vertically extending handgrip portion 216 that is substantially vertical and extends slightly forwardly. Central rear portion 212 is narrower than central rear portion 198 of handlebars 154, for example, but is sufficiently wide to permit the attachment of forearm rests, such as forearm rests 60 in a manner such that a rider's forearms will be in contact with each other when handgrip portion 216 is grasped by the rider's hands. Handlebar 156 provides for additional gripping portions, such as at central rear portion 212 and at forwardly and inwardly extending portions 214.

Figure 30:
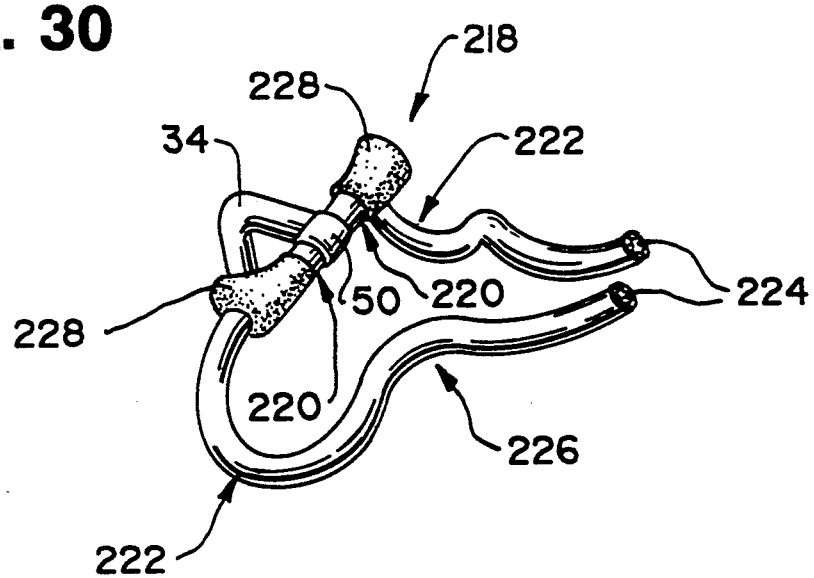
FIG. 30 is a perspective view of another handlebar embodiment in accordance with the present invention.

FIG. 30 illustrates handlebars 218, another embodiment of the handlebar system of the present invention. Handlebars 218 provide a riding position in which the rider's arms extend forward over the crosspieces. Yet these bars also provide the rider with sprinting or "on-the-drops" hand positions similar to those provided by conventional racing handlebars. The forwardly extending and sprinting positions, as well as various other positions, are provided by handlebars 218. Handlebars 218 include a crosspiece 220 to which the stem 34 is connected by stem clamp 50. Extending outwardly and downwardly from the crosspiece 220 are first handle portions 222 which include the sprinting portions. Handlebars 218 then extend upward and inward to provide secondary handle portions 224. Secondary handle portions 224 are located so that, when they are grasped by the rider, the rider's forearms are located to be supported by the handlebars 218 at positions over the crosspiece 220. The handlebars are further arranged such that the rider's hands are positioned closer and closer together as they approach end 226 of secondary handle positions 224. Inwardly tapered forearm rests 228 are positioned over the crosspieces 220 to increase the rider's comfort when using secondary handle portions 224. Forearm rests 228 are configured such that the rider can grasp over them to steer the bicycle in a climbing position. Handlebars 218 are preferably formed from a single piece of 6061-T6 aluminum tubing which is at least 54 inches long.

Figure 31:
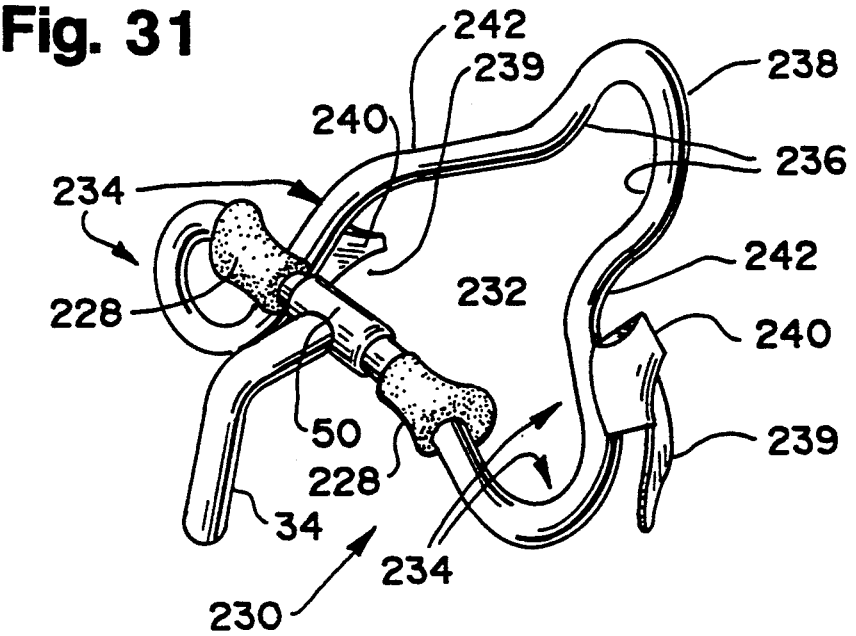
FIG. 31 is a perspective view of still another embodiment in accordance with the present invention.

Referring to FIG. 31, there is illustrated another handlebar in accordance with the present invention. Handlebar 230 includes a crosspiece section 232 to which stem 34 is connected to a central portion of crosspiece section 232 by a stem clamp 50. Stem 34 may be raised or lowered relative to the head tube 32 by adjusting a stem bolt (not shown). Extending from opposite ends of crosspiece section 232 are turned portions 234 that extend generally forwardly and inwardly to define a pair of forward handle portions 236 located and adapted to be grasped in a known manner by a rider. A front loop portion 238 interconnects forward handle portions 236 so that handlebar 230 defines a continuous loop forward of the steering post. Front loop portion 238 may be a separate removable section (not shown) or front loop portion 238 may form an integral part of handlebar 230 as illustrated in FIG. 31, where front loop portion 238 of handlebar 230 is an integral front loop portion. Front loop 238 also provides a location where rider R can grip. Padding or other material, such as plastic, rubber or tape, for example, can be attached over front loop portion 238 and even over forward handle portions 236, if desired, to provide a desired shape to facilitate gripping by a rider. A pair of brake-operating levers 239 extend from brake hoods 240 located upon turned portions 234.

Each of turned portions 234 include downwardly inclined bends 241 that extend below crosspiece section 232 followed by upwardly inclined bends 242 which extend into the pair of forward handle portions 236.

Forward handle portions 236 of handlebar 230 are relatively closely spaced and are spaced apart less than the width of crosspiece section 232. The center-to-center distance D between forward handle portions 236 is preferably about four inches. Also, forward handle portions 236 preferably extend upwardly to facilitate grasping by the rider. If desired, other portions of handlebar 230 can be grasped by the rider, such as crosspiece section 232 or turned portions 234.

It is to be understood that the brake hoods and brake levers as well as the bicycle gear shift lever(s) may be mounted in any convenient or desired location on the handlebars of the present invention. For example, a gear shift lever (not shown) can be mounted at either end of the vertical handgrip portion 58, 88, 96, 110, 118, 126, 142, 164, 174, 192, 201, 210 and 216 of FIGS. 1, 6, 8, 10, 12, 14, 16, 18, 20, 22, 24, 26 and 28, respectively, or at any other convenient or desired location on the handlebars. Brake hoods and levers such as brake hood 64 and brake lever 62 could be mounted as shown in FIG. 1 or could be mounted in other locations as desired, such as on horizontal member 98 of FIG. 7, horizontal portions 114 of FIG. 9, U-shaped extension member 116 of FIG. 12, horizontal portion 128 of FIG. 14, U-shaped extension member 132 of FIG. 16, converging portions 162 of FIG. 18, forward crosspiece 170, inverted U-shaped forward portion 172, or forwardly extending portions 168 of FIG. 20, crosspiece 184, forwardly extending portions 186, forward crosspiece 188, inverted U-shaped forward portion 190 and downwardly curved portions 194 and 196 of FIG. 22, handlebar portions 197, handgrip 201 and upwardly extending bends 199 of FIG. 24, central rear portion 198, downwardly extending portion 200, first forwardly extending portions 202, upwardly extending portions 204, lateral converging portions 206 and second forwardly extending portions 208 of FIG. 26 and central rear portion 212, forwardly and inwardly extending portions 214 and handgrip portion 216 of FIG. 28.

I claim:

1. A bicycle comprising a frame, a rear wheel journaled to the frame, a steering post journaled to the frame, a front fork attached to the steering post, a front wheel journaled to the fork, a saddle affixed to the frame at a predetermined position above the frame, and a handlebar connected to the steering post, the handlebar including a rear portion connected to the steering post, a central forward portion providing a substantially vertical handgrip for a rider's hands and an intermediate portion extending forwardly from the rear portion and connecting the rear portion with the forward portion, said handgrip portion being located substantially along the longitudinal centerline of the bicycle and above the horizontal plane of the crosspiece to define a rider position in which the rider's elbows are located close together near the central rear portion and the rider's arms extend forwardly when the rider's hands are grasping the substantially vertical handgrip portion.

2. The bicycle of claim 1 wherein said rear portion includes rear sideways portions extending on each side of said steering post for supporting a rider's forearms.

3. The bicycle of claim 1 wherein said handlebar further comprises forward sideways portions extending on each side of said vertical handgrip portion.

4. The bicycle of claim 3 further comprising turned portions extending from said forward sideways portions including rearwardly turned bends that extend rearwardly followed by inwardly turned bends that extend to the steering post for supporting a rider's forearms.

5. An adapter for a bicycle having an original handlebar connected to a steering post, comprising:
a handlebar extension member having at least one clamp at an end thereof for engaging the original handlebar, said handlebar extension member having a forwardly extending intermediate portion, and a substantially vertical handgrip portion connected to said intermediate portion and locatable by said extension member substantially along the longitudinal centerline of the bicycle and above the horizontal plane of the original handlebar to define a rider position in which the rider's hands can overlap each other while grasping the substantially vertical handgrip portion with the rider's arms extending forwardly toward the handgrip portion.

6. The adapter of claim 5 wherein the intermediate portion is elongated and the length from the substantially vertical handgrip portion to the steering post is in the range of from about 9 to 14 inches.

7. The adapter of claim 5 further comprising a horizontal portion extending laterally from said substantially vertical handgrip portion.

8. The adapter of claim 7 wherein said horizontal portion extends from both sides of said handgrip portion.

9. The adapter of claim 8 wherein said handgrip portion and said horizontal portion form a T-shape.

10. The adapter of claim 5 wherein said clamp can be rotated with respect to the original handlebar to selectively raise or lower said intermediate portion and said handgrip portion.

11. The adapter of claim 5 wherein said handlebar extension member is U-shaped and has a clamp at each end for attachment to the original bar, said handgrip portion extending from the apex of said U-shaped extension member and said U-shaped extension member providing additional hand positions for a rider.

12. The adapter of claim 11 wherein said handgrip portion extends upwardly when said extension member is mounted in a forwardly extending position on the original handlebar.

13. The adapter of claim 11 wherein said handgrip portion is rotatable about said U-shaped extension portion to change the inclination of said handgrip portion.

14. The adapter of claim 12 wherein said handgrip portion extends downwardly.

15. The adapter of claim 12 wherein said handgrip portion extends upwardly.

16. The adapter of claim 5 further comprising at least one forearm rest securable to the original handlebar to form a forearm rest.

17. A bicycle handlebar mountable to a bicycle steering post located above the front wheel and forwardly of a bicycle seat, comprising:
   a central crosspiece connectable to the steering post,
   at least one intermediate portion extending forwardly from the central crosspiece to a region forward of the crosspiece,
   a substantially vertical handgrip portion extending from the intermediate portion and located substantially along the longitudinal centerline of the bicycle and above the horizontal plane of the central crosspiece to define a rider position in which the rider's arms extend forwardly and the rider's hands can overlap each other while grasping the substantially vertical handgrip portion.

18. The handlebar of claim 17 wherein said at least one intermediate portion comprises two sections each extending forwardly from opposite sides of the central crosspiece and turning upwardly and inwardly to define a loop located forward of the crosspiece and at least partly above the handgrip portion, and the handgrip portion being located on the bottom of the loop and extending generally downwardly therefrom to define the substantially vertical handgrip portion.

19. The handlebar of claim 17 wherein said at least one intermediate portion comprises a pair of tubes each extending forwardly from opposite sides of the central crosspiece and turning inwardly and upwardly at end sections thereof, said end sections converging into abutting contact and extending together generally upward to thereby create said substantially vertical handgrip portion.

20. The handlebar of claim 19 including tape wrapped around the abutting end sections to define a single substantially vertical handgrip portion.

21. The handlebar of claim 17 wherein the substantially vertical handgrip portion is located forwardly from the center of the crosspiece in a range from nine inches to fourteen inches.

22. The handlebar of claim 17 wherein said substantially vertical handgrip portion further includes a pair of horizontal portions extending laterally from an end of said substantially vertical handgrip portion to form therewith a generally T shaped grip for the rider's hands.

23. The handlebar of claim 17 further including a pair of pads associated with the central crosspiece and each extending above the crosspiece on opposite sides of the steering post to form a pair of forearm rests for the rider's arms while the rider's hands grasp the substantially vertical handgrip portion.

24. The handlebar of claim 17 wherein the at least one intermediate portion includes turned portions each extending from opposite sides of the central crosspiece and extending generally forwardly and converging inwardly to define a continuous loop located forward of the steering post, the handgrip portion extending substantially vertically from a forward center portion of the loop.

25. The handlebar of claim 17 including an adapter means for adjustably connecting the intermediate portion to the central crosspiece.

26. A bicycle handlebar mountable to a bicycle steering post located forwardly of a bicycle seat, comprising:
   a crosspiece having a central portion connectable with said steering post and sideways portions extending therefrom,
   a pair of pads each associated with one of the sideways portions and extending thereabove to form a pair of forearm rest for the rider's arm,
   at least one intermediate portion extending forwardly from the crosspiece to a region forward of the crosspiece, and
   a substantially vertical handgrip portion extending from the intermediate portion and located substantially along the longitudinal center line of the bicycle to define with the pair of forearm rests a rider position that has a minimized frontal profile while the rider's hands extend forwardly and can overlap each other while grasping the substantially vertical handgrip portion.

27. The handlebar of claim 26 wherein the intermediate portion includes turned portions each extending integrally from the pair of sideways portions of the crosspiece and turning generally forwardly and then inwardly to converge so as to define a continuous loop located forward of the steering post, the handgrip portion extending substantially vertical from a forward center portion of the loop.

28. The handlebar of claim 27 further including a pair of hand brake mechanisms located on the continuous loop and having brake levers extending generally near the front portions of the loop for activation while the rider's hands are substantially forward of the crosspiece.

29. The handlebar of claim 26 wherein the pair of pads each have an arcuate cross section along a lateral direction parallel to the crosspiece and a longitudinal extent greater than the crosspiece longitudinal extent to form the forearm rest for the rider's forearm.

30. The handlebar of claim 26 including an adapter means for adjustable connecting the intermediate portion to the crosspiece.

31. The handlebar of claim 30 wherein said adapter means allows the intermediate portion to be rotated with respect to the crosspiece to selectively raise or lower said intermediate portion and said handgrip portion.

32. A bicycle handlebar mountable to a bicycle steering post located forwardly of a bicycle seat, comprising:
   a central crosspiece connectable to the steering post,
   at least one intermediate portion extending forwardly from the central crosspiece to a region forward of the crosspiece,
   a generally T shaped handgrip portion extending from the intermediate portion and having a generally vertical section located substantially along the longitudinal centerline of the bicycle and a pair of generally horizontal sections each extending outward from and end region of the generally vertical section.

33. The handlebar of claim 32 wherein the pair of generally horizontal sections extend from the top of the T shaped handgrip portion so that the horizontal sections provide a resting area for the rider's thumbs when the rider's hands are gripping said substantially vertical section.

34. The handlebar of claim 32 wherein said section is formed by a single generally vertical tube extending upwardly and the pair of generally horizontal sections are formed by a single tube extending generally equidistant from each side of the vertical single tube.

35. The handlebar of claim 32 wherein said generally T shaped handgrip portion is formed by a pair of tubes which converge into abutting contact to form the generally vertical section and then each turn outwardly to thereby define the generally horizontal sections.

36. The handlebar of claim 32 including an adapter means for adjustable connecting the intermediate portion of the crosspiece.

* * * * *